(12) United States Patent
Kasahara

(10) Patent No.: US 11,162,541 B2
(45) Date of Patent: Nov. 2, 2021

(54) TORQUE TRANSMISSION APPARATUS

(71) Applicant: Honda Motor Co., Ltd., Tokyo (JP)

(72) Inventor: Takahiro Kasahara, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 3 days.

(21) Appl. No.: 16/865,571

(22) Filed: May 4, 2020

(65) Prior Publication Data

US 2020/0355225 A1 Nov. 12, 2020

(30) Foreign Application Priority Data

May 9, 2019 (JP) .............................. JP2019-088761

(51) Int. Cl.
*F16D 13/74* (2006.01)
*F16H 57/04* (2010.01)

(52) U.S. Cl.
CPC ......... *F16D 13/74* (2013.01); *F16H 57/0445* (2013.01); *F16H 57/0473* (2013.01); *F16H 57/0482* (2013.01)

(58) Field of Classification Search
CPC ... F16D 13/74; F16H 57/0473; F16H 57/0482
See application file for complete search history.

(56) References Cited

U.S. PATENT DOCUMENTS

| 2004/0159521 A1* | 8/2004 | Yamamura | F16D 25/123 192/70.12 |
| 2015/0292613 A1* | 10/2015 | Tonokura | F16H 57/0484 475/159 |
| 2017/0089452 A1* | 3/2017 | Deutsch | F16D 13/76 |

FOREIGN PATENT DOCUMENTS

JP 2019052654 A 4/2019

* cited by examiner

*Primary Examiner* — Huan Le
(74) *Attorney, Agent, or Firm* — Duft & Bornsen, PC

(57) ABSTRACT

A transmission including a rotating shaft, a planetary gear mechanism, a friction engagement device disposed on radial outside of a ring gear of the planetary gear mechanism, a plate attached to the ring gear so as to face an outer circumferential surface of the ring gears, and a restriction member attached to the ring gear to restrict a movement of the plate in an axial direction. A first oil hole is formed at the ring gear so as to lead an oil supplied from an oil passage inside the rotating shaft to an outside of the ring gear in the radial direction, and a second oil hole is formed at the plate so as to lead the oil led through the first oil hole to the friction engagement device.

9 Claims, 6 Drawing Sheets

TORQUE TRANSMISSION APPARATUS

CROSS-REFERENCE TO RELATED APPLICATION

This application is based upon and claims the benefit of priority from Japanese Patent Application No. 2019-088761 filed on May 9, 2019, the content of which is incorporated herein by reference.

BACKGROUND OF THE INVENTION

Field of the Invention

This invention relates to a torque transmission apparatus provided at a vehicle.

Description of the Related Art

Conventionally, as this type of apparatus, there is a known apparatus, described in Japanese Unexamined Patent Publication No. 2019-052654 (JP2019-052654A). The apparatus of JP2019-052654A includes a planetary gear mechanism, a friction engagement device disposed on the radial outside of a ring gear of the planetary gear mechanism, and plate-shaped covering members interposed between the ring gear and friction engagement device. The ring gear and covering members are provided with respective through holes, and oil supplied from the inside of the planetary gear mechanism is supplied to the friction engagement device through the through holes of the ring gear and covering members.

However, since in the apparatus of JP2019-052654A, the covering members are integrally formed through a coupling portion, it is difficult to mount the covering members.

SUMMARY OF THE INVENTION

An aspect of the present invention is a torque transmission apparatus, including: a rotating shaft extended along an axial line; a planetary gear mechanism including a sun gear rotatably disposed about the axial line, planetary gears engaged with the sun gear, and a ring gear rotatably disposed about the axial line and engaged with the planetary gear; a friction engagement device disposed on an outside of the ring gear in a radial direction; a plate attached to the ring gear so as to face an outer circumferential surface of the ring gears; and a restriction member attached to the ring gear to restrict a movement of the plate in an axial direction. A first oil hole is formed at the ring gear so as to lead an oil supplied from an oil passage inside the rotating shaft to an outside of the ring gear in the radial direction, a second oil hole is formed at the plate so as to lead the oil led through the first oil hole to the friction engagement device, a plurality of the first oil holes in a circumferential direction are formed at the ring gear, and a plurality of the plates in the circumferential direction are attached to the ring gear so as to face the plurality of the first oil holes.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Figure 1:
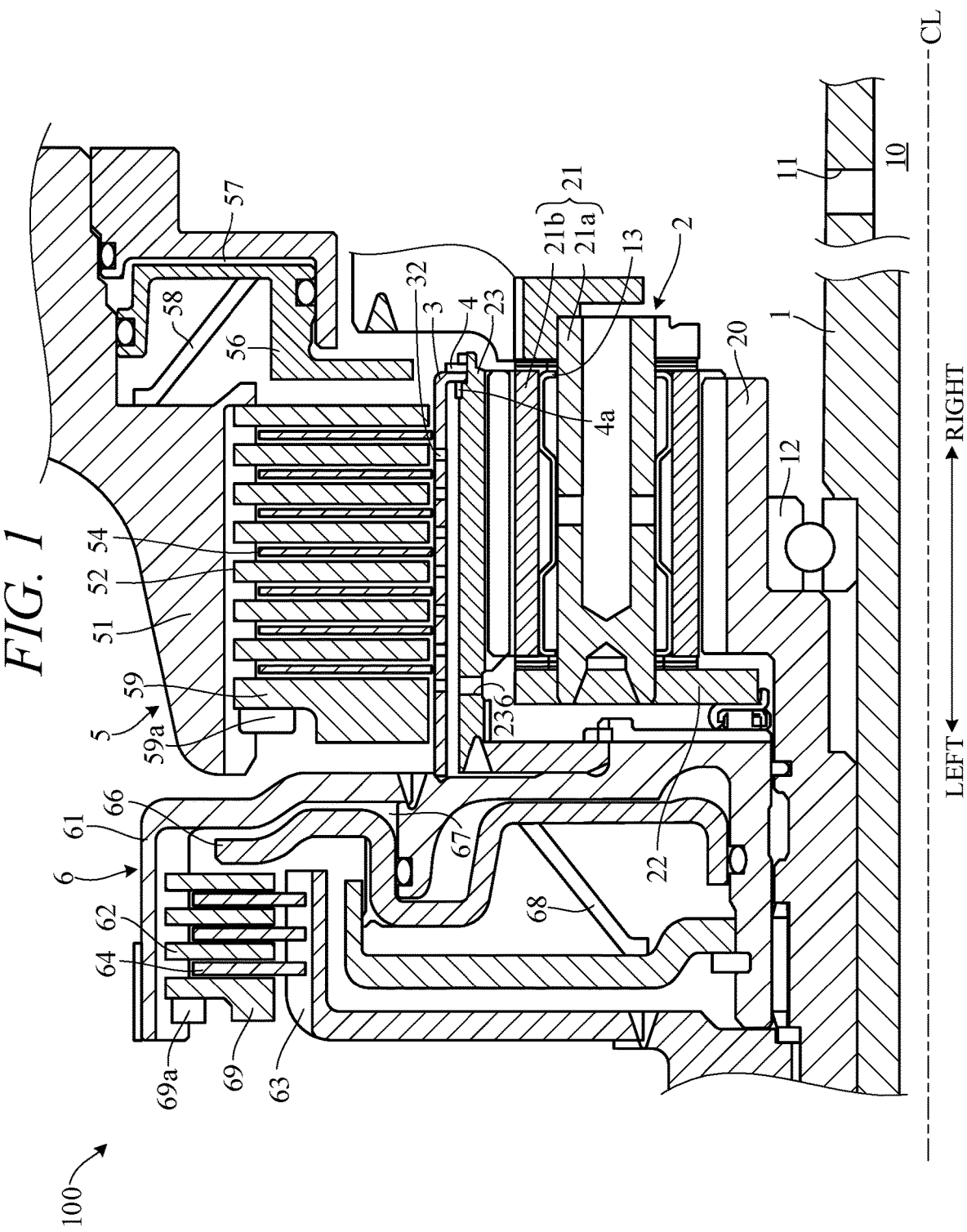
FIG. 1 is a sectional view schematically showing main components of a transmission to which a torque transmission apparatus according to the embodiment of the present invention is applied.

Hereinafter, an embodiment of the present invention is explained with reference to FIGS. 1 to 7. FIG. 1 is a sectional view showing the configuration of main components of a transmission 100 to which a torque transmission apparatus according to the embodiment of the present invention is applied. For convenience, a direction along an axis CL, which is the rotation center of an input shaft 1 shown in FIG. 1, is defined as the axial direction (the left-right direction), and a direction extending radially from the axis CL as the radial direction. The configuration of the components will be described in accordance with these definitions. The axial direction is, for example, the width direction or length direction of the vehicle.

The transmission 100 according to the present embodiment is configured to speed-change a rotation output from the drive source, such as the engine or motor, mounted on the vehicle, and to transmit the driving force generated by the drive source to the drive wheels. As shown in FIG. 1, the transmission 100 includes the input shaft (rotating shaft) 1 that rotates about the axis CL, a planetary gear mechanism 2 centered on the axis CL and disposed around the input shaft 1, multiple oil plates (plate members) 3 attached to the planetary gear mechanism 2, a ring member (engagement member) 4 that fixes to the oil plates 3 to the planetary gear mechanism 2, a brake device (friction engagement device) 5 disposed on the radial outside of the planetary gear mechanism 2, and a clutch device 6 disposed on an axial side of the brake device 5.

In a casing (not shown), the input shaft 1 is rotatably supported by the casing. An oil passage 10 is formed inside the input shaft 1. Oil in the oil passage 10 is supplied to the brake device 5 through an oil hole 11 formed in the input shaft 1 and the planetary gear mechanism 2.

Figure 2:
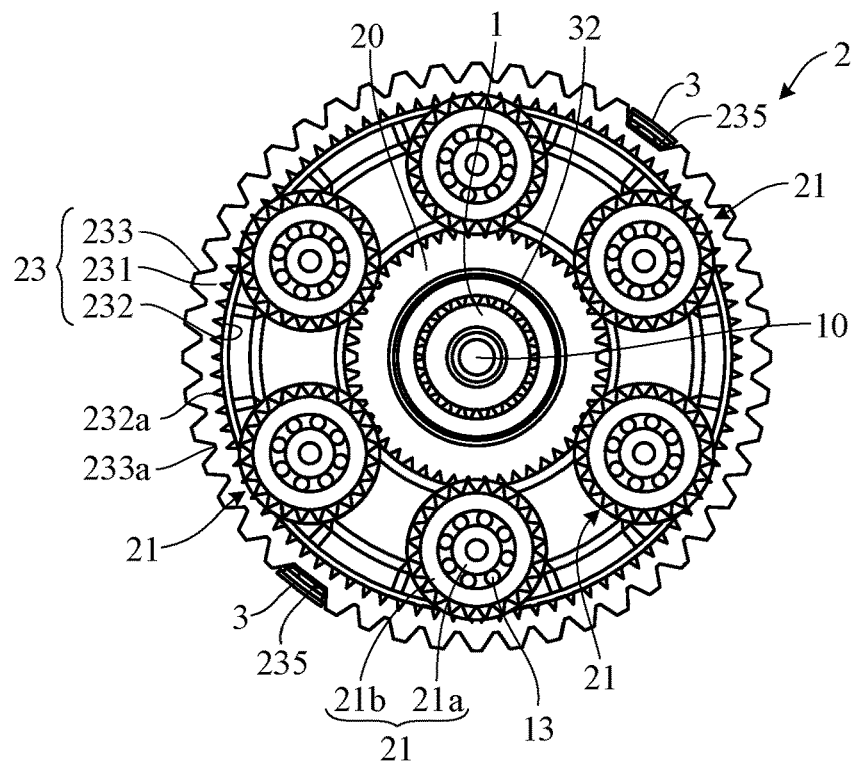
FIG. 2 is a sectional view taken along a plane perpendicular to an axial line of a planetary gear mechanism in the transmission of FIG. 1.

FIG. 2 is a sectional view showing the overall configuration of the planetary gear mechanism 2 in FIG. 1. As shown in FIGS. 1 and 2, the planetary gear mechanism 2 includes a sun gear 20 that rotates about the axis CL, multiple planetary gears 21 disposed around the sun gear 20 and engaged with the sun gear 20, a planetary carrier 22 that rotatably supports the planetary gears 21, and a ring gear 23 centered on the axis CL, disposed around the planetary gears 21, and engaged with the planetary gears 21.

The sun gear 20 is disposed around the input shaft 1 with a bearing 12 so as to be rotatable relative to the input shaft 1. The planetary gears 21 each include a pinion shaft 21a supported by the planetary carrier 22 and a pinion gear 21b rotatably supported by the pinion shaft 21a through a bearing 13. Although not shown in FIG. 1, multiple external teeth 233 (FIG. 3) are formed over the outer circumferential surface of the ring gear 23.

The brake device 5 includes an approximately cylindrical brake drum 51 formed on the inner circumferential surface of a case (not shown) and centered on the axis CL, approximately annular disc-shaped brake plates 52 engaged with the inner circumferential surface of the brake drum 51 and centered on the axis CL, and approximately annular disc-shaped brake discs 54 engaged with the outer circumferential surface of the ring gear 23 and centered on the axis CL.

Axially extending multiple spline grooves are formed in the inner circumferential surface of the brake drum 51 at predetermined intervals in the circumferential direction. The same number of protruding teeth as the number of spline grooves are formed on the outer circumferential portions of the brake plates 52. The teeth of the brake plates 52 are engaged with the spline grooves of the brake drum 51 so as to be axially movable and be rotatable integrally with the brake drum 51.

Figure 3:
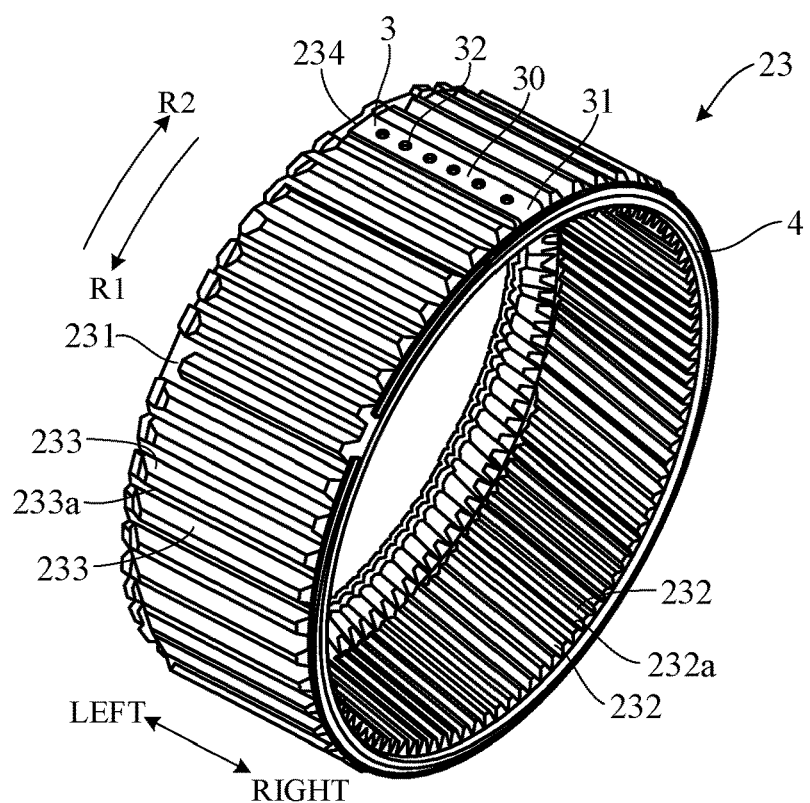
FIG. 3 is a perspective view showing an overall configuration of a ring gear of the planetary gear mechanism of FIG. 2.

FIG. 3 is a perspective view showing the overall configuration of the ring gear 23. As shown in FIG. 3, multiple spline grooves 233a extending in the axial direction (the left-right direction) are formed in the outer circumferential surface of the ring gear 23 at predetermined intervals in the circumferential direction. The same number of protruding teeth as the number of spline grooves 233a are formed on the inner circumferential portion of the brake discs 54 in FIG. 1. The teeth of the brake discs 54 are engaged with the spline grooves 233a of the ring gear 23 so as to be axially movable and be rotatable integrally with the ring gear 23.

The brake plates 52 and brake discs 54 are axially alternately disposed. Linings (friction members) are formed on both axial end surfaces of the respective brake plates 52 and brake discs 54.

A piston 56 is disposed on the right side of the brake plates 52 and brake discs 54. The piston 56 is configured to be axially movable relative to the brake drum 51 in the radial inside of the brake drum 51. The gap between the piston 56 and casing forms a cylinder chamber 57, and the oil is supplied to the cylinder chamber 57. The piston 56 is energized rightward (in the direction in which the pressing force against the brake plates 52 and brake discs 54 is removed) by a return spring 58.

An end plate 59 is disposed on the left side of the brake plates 52 and brake discs 54. A regulation member 59a for regulating movement of the end plate 59 is disposed on the left side of the end plate 59.

When the oil is supplied to the cylinder chamber 57, the piston 56 is pushed leftward (in the direction in which the pressing force acts on the brake plates 52 and brake discs 54). Thus, friction occurs between the linings of the brake plates 52 and the linings of the brake discs 54, resulting in a stop of rotation of the ring gear 23. That is, the ring gear 23 is fixed to the casing.

The clutch device 6 includes a bottomed cylindrical clutch drum 61 centered on the axis CL, approximately annular disc-shaped multiple clutch plates 62 engaged with the inner circumferential surface of the clutch drum 61 and centered on the axis CL, a clutch hub 63 that is disposed on the radial inside of the clutch drum 61 and rotates about the axis CL, and approximately annular disc-shaped clutch discs 64 engaged with the outer circumferential surface of the clutch hub 63 and centered on the axis CL.

Axially extending multiple spline grooves are formed in the inner circumferential surface of the clutch drum 61 at predetermined intervals in the circumferential direction. The same number of protruding teeth as the number of spline grooves are formed on the outer circumferential portions of the clutch plates 62. The teeth of the clutch plates 62 are engaged with the spline grooves of the clutch drum 61 so as to be axially movable and be rotatable integrally with the clutch drum 61.

Axially extending multiple spline grooves are formed in the outer circumferential surface of the clutch hub 63 at predetermined intervals in the circumferential direction. The same number of protruding teeth as the number of spline grooves are formed on the inner circumferential portions of the clutch discs 64. The teeth of the clutch discs 64 are engaged with the spline grooves of the clutch hub 63 so as to be axially movable and be rotatable integrally with the clutch hub 63.

The clutch plates 62 and clutch discs 64 are axially alternately disposed. Linings (friction members) are formed on both axial end surfaces of the respective clutch plates 62 and clutch discs 64.

A piston 66 is disposed on the right side of the clutch plates 62 and clutch discs 64. The piston 66 is configured to be axially movable relative to the clutch drum 61 in the radial inside of the clutch drum 61. The gap between the piston 66 and casing forms a cylinder chamber 67, and the oil is supplied to the cylinder chamber 67. The piston 66 is energized rightward (in the direction in which the pressing force against the clutch plates 62 and clutch discs 64 is removed) by a return spring 68.

An end plate 69 is disposed on the left side of the clutch plates 62 and clutch discs 64. A regulation member 69a for regulating movement of the end plate 69 is disposed on the left side of the end plate 69.

When the oil is supplied to the cylinder chamber 67, the piston 66 is pushed leftward (in the direction in which the pressing force acts on the clutch plates 62 and clutch discs 64). Thus, friction occurs between the linings of the clutch plates 62 and the linings of the clutch discs 64, resulting in integral rotation of the ring gear 23, clutch hub 63, and clutch drum 61.

Figure 4A:
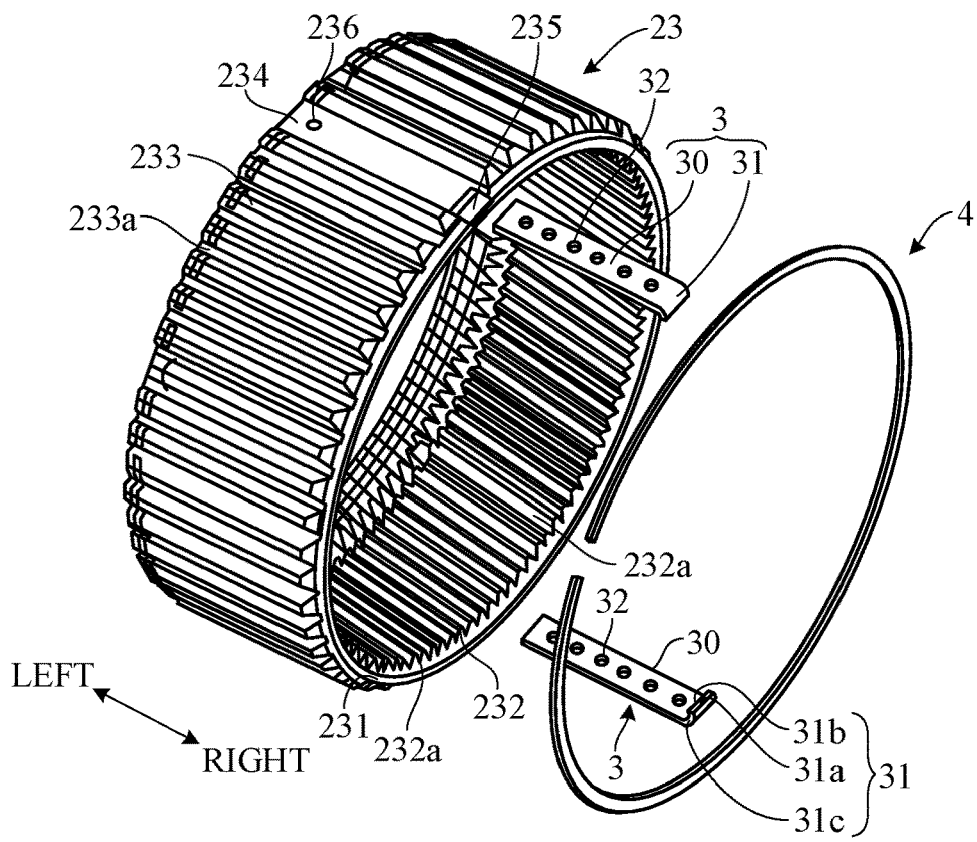
FIG. 4A is an exploded perspective view showing a state in which an oil plate is removed from the ring gear of FIG. 3.
Figure 4B:
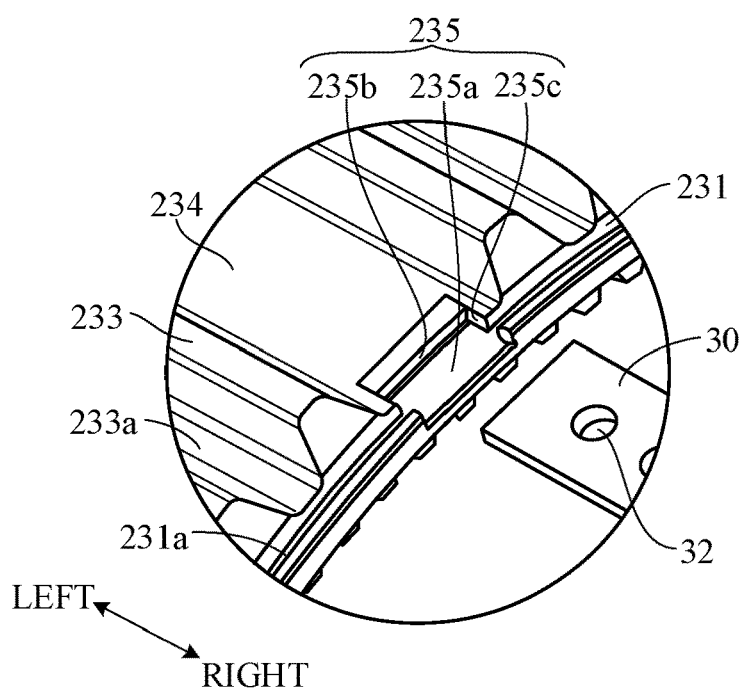
FIG. 4B is an enlarged view of main components of FIG. 4A.

FIG. 4A is an exploded perspective view showing a state in which the oil plates 3 are removed from the ring gear 23 in FIG. 3, and FIG. 4B is an enlarged view of main components in FIG. 4A. In FIG. 3, a rotation direction R1 (first direction) represents the rotation direction of the ring gear 23 during forward travel of the vehicle having the transmission 100 mounted thereon, and a rotation direction R2 represents the rotation direction of the ring gear 23 during rearward travel of this vehicle.

As shown in FIGS. 2, 3, and 4A, the ring gear 23 includes an approximately cylindrical body 231, internal teeth 232 including multiple tooth rows formed on the inner circumferential surface of the body 231, external teeth 233 including multiple tooth rows formed on the outer circumferential surface of the body 231, and multiple non-toothed portions 234 formed by partially removing the external teeth 233 formed on the outer circumferential surface of the body 231.

The internal teeth 232 are disposed so as to protrude radially inwardly from the inner circumferential surface of the body 231. Spline grooves 232a are formed between the circumferentially adjacent internal teeth 232 so as to be engaged with teeth on the outer circumference surface of the pinion gear 21b. The external teeth 233 are disposed so as to protrude radially outwardly from the outer circumferential surface of the body 231. Spline grooves 233a are formed between the circumferentially adjacent external teeth 233 so as to be engaged with teeth on the inner circumferential surfaces of the brake discs 54.

The non-toothed portions 234 are disposed at equal intervals in the circumferential direction (e.g., in two locations in the circumferential direction). Each non-toothed portion 234 is approximately in the shape of a plane and is formed by removing one external tooth 233. Also, the non-toothed portions 234 are formed so as to be approximately flush with the bottom of the spline groove 233a formed in the outer circumferential surface of the body 231.

The right end of each non-toothed portion 234 is provided with an engagement groove 235 for engaging an oil plate 3. As shown in FIG. 4B, the engagement groove 235 is in a concave shape and is formed by notching the right end of the non-toothed portion 234 leftward. The engagement groove 235 has a first surface 235a in contact with the end surface 31a of a bend portion 31 of the oil plate 3 mounted on the ring gear 23 (see FIG. 4A), a second surface 235b in contact with the inner surface 31b (see FIG. 4A) of the bend portion 31, and a pair of third surfaces 235c in contact with both side surfaces 31c (see FIG. 4A) of the bend portion 31.

The first surface 235a is approximately in the same shape as that of the outer circumferential surface of the body 231. Since the bend portion 31 is in contact with the first surface 235a, radially inward movement of the oil plate 3 is regulated. The first surface 235a is formed such that a plate portion 30 of the oil plate 3 is spaced from the non-toothed portion 234 by a predetermined interval with the end surface 31a of the bend portion 31 of the oil plate 3 in contact with the first surface 235a.

The second surface 235b is formed so as to be approximately perpendicular to the outer circumferential surface of the body 231 on the left end surface of the engagement groove 235. Since the bend portion 31 is in contact with the second surface 235b, movement in another axial direction of the oil plate 3 is regulated.

The pair of third surfaces 235c and 235c are formed so as to be approximately perpendicular to the outer circumferential surface of the body 231 on both sides in the circumferential direction of the first surface 235a. Since the bend portion 31 is in contact with the pair of third surfaces 235c and 235c, circumferential movement of the oil plate 3 is regulated.

As shown in FIG. 4A, the left end of each non-toothed portion 234 is provided with a first oil hole 236 that radially passes through the ring gear 23. The first oil hole 236 is formed in an approximately central portion in the circumferential direction of the non-toothed portion 234. In other words, the first oil hole 236 is formed in an approximately central portion of the non-toothed portion 234 in the rotation direction of the ring gear 23.

Also, the first oil hole 236 is formed in an internal tooth 232-absent position of the inner circumferential surface of the body 231 of the ring gear 23. Specifically, as shown in FIGS. 3 and 4A, the internal teeth 232 are not formed on the left end of the inner circumferential surface of the body 231, and the first oil hole 236 is formed in this left end. That is, as shown in FIG. 1, the first oil hole 236 is formed in a position that does not axially overlap any pinion gear 21b engaged with the internal teeth 232 of the ring gear 23.

While, in the present embodiment, the first oil holes 236 are formed in the approximately central portions in the circumferential direction of the non-toothed portions 234, the first oil holes 236 may be formed, for example, in more forward positions of the non-toothed portions 234 in the rotation direction R1 of the ring gear 23. Thus, when a rotational force or centrifugal force acts on the oil supplied through the first oil holes 236 due to rotation of the ring gear 23 during forward travel of the vehicle, the oil can be efficiently led to multiple second oil holes 32 formed in the oil plate 3.

As shown in FIGS. 3 and 4A, multiple oil plates 3 are attached to the respective non-toothed portions 234 formed on the ring gear 23 of the planetary gear mechanism 2. Specifically, the oil plates 3 are attached to the respective non-toothed portions 234 disposed in two locations in the circumferential direction.

The number of oil plates 3 only has to be the same as that of non-toothed portions 234 formed on the ring gear 23. For example, if the non-toothed portions 234 are disposed in six locations of the ring gear 23, the number of oil plates 3 would be six. Also, the non-toothed portions 234 do not have to be disposed in two locations and only have to be disposed in multiple locations. Preferably, the non-toothed portions 234 are disposed at equal intervals in the circumferential direction. Thus, the oil plates 3 are disposed at equal intervals in the circumferential direction, allowing for uniformly supplying the oil to the brake device 5.

The oil plates 3 is made of elastic metal members. Each oil plate 3 includes the rectangular plate-shaped plate portion 30 disposed on a non-toothed portion 234 and the bend portion 31 engaged with the engagement groove 235 thereof. The plate portion 30 has a circumferential length and axial length corresponding to those of the non-toothed portion 234. The bend portion 31 is formed by bending the right end of the plate portion 30 radially inwardly of the ring gear 23.

The plate portion 30 are provided with the second oil holes 32. As shown in FIG. 4A, the second oil holes 32 are formed in an approximately central portion in the circumferential direction of the plate portion 30 at equal intervals in the axial direction. For example, six second oil holes 32 are formed in an approximately central portion in the circumferential direction of the plate portion 30 at equal intervals in the axial direction. The second oil holes 32 are approximately in the same shape. For example, the second oil holes 32 are approximately in the shape of circles.

The bend portion 31 is formed by bending one axial end of the plate portion 30 radially inwardly of the ring gear 23 by 90°. The bend portion 31 has the end surface 31a in contact with the first surface 235a of the engagement groove 235, the inner surface 31b in contact with the second surface 235b, and the pair of side surfaces 31c in contact with the pair of third surfaces 235c.

The end surface 31a is formed approximately parallel with the outer surface (the radially outer surface) and the inner surface (the radially inner surface) of the plate portion 30. The inner surface 31b is formed approximately perpendicular to the inner surface and outer surface of the plate portion 30. The pair of side surfaces 31c are located approximately flush with the pair of side surfaces of the plate portion 30.

As shown in FIGS. 1 and 4A, an approximately annular ring member 4 is attached to the right end of the ring gear 23. The ring member 4 serves as a restriction member that restricts rightward movement of the oil plates 3 in contact with axially the oil plates 3 attached to the non-toothed portions 234 of the ring gear 23.

More specifically, as shown in FIG. 4B, an attachment groove 231a is formed over the entire circumference at the right end of the body 231 of the ring gear 23. With the oil plates 3 attached, the ring member 4 is attached to the attachment groove 231a so as to be fitted into the attachment groove 231a.

When the oil plates 3 is attached to the ring gear 23, the brake discs 54 are attached to the outer circumferential surface of the ring gear 23 along the spline grooves 233a and then the plate portions 30 are inserted into the gaps between the non-toothed portions 234 of the ring gear 23 and the inner circumferential surfaces of the brake discs 54. Then, the bend portions 31 are engaged with the engagement grooves 235 of the right ends of the non-toothed portions 234.

Thus, the plate portions 30 are attached to the non-toothed portions 234 so as to be spaced from the non-toothed portions 234 by a predetermined radial clearance, as well as disposed so as to be spaced from the first oil holes 236 by a predetermined interval and to face the first oil holes 236. The radial positions of the outer surfaces of the plate portions 30 are regulated by the inner circumferential surfaces of the brake discs 54.

After the bend portions 31 are engaged with the engagement grooves 235, the ring member 4 is attached to the right end of the ring gear 23. Thus, as shown in FIG. 1, the right ends of the oil plates 3 are in contact with the ring member 4 to restrict the movement of the oil plates 3 in the axial direction, and the left ends thereof are in contact with the clutch drum 61 of the clutch device 6.

As shown in FIG. 1, elastic members 4a, such as rubber springs or metal springs, are disposed on the left side of the bend portions 31. Thus, the bend portions 31 are pressed rightward by the energizing force of the elastic members 4a and brought into contact with the ring member 4. That is, the oil plates 3 (bend portions 31) are sandwiched and firmly supported between the ring member 4 and elastic members 4a.

Figure 5:
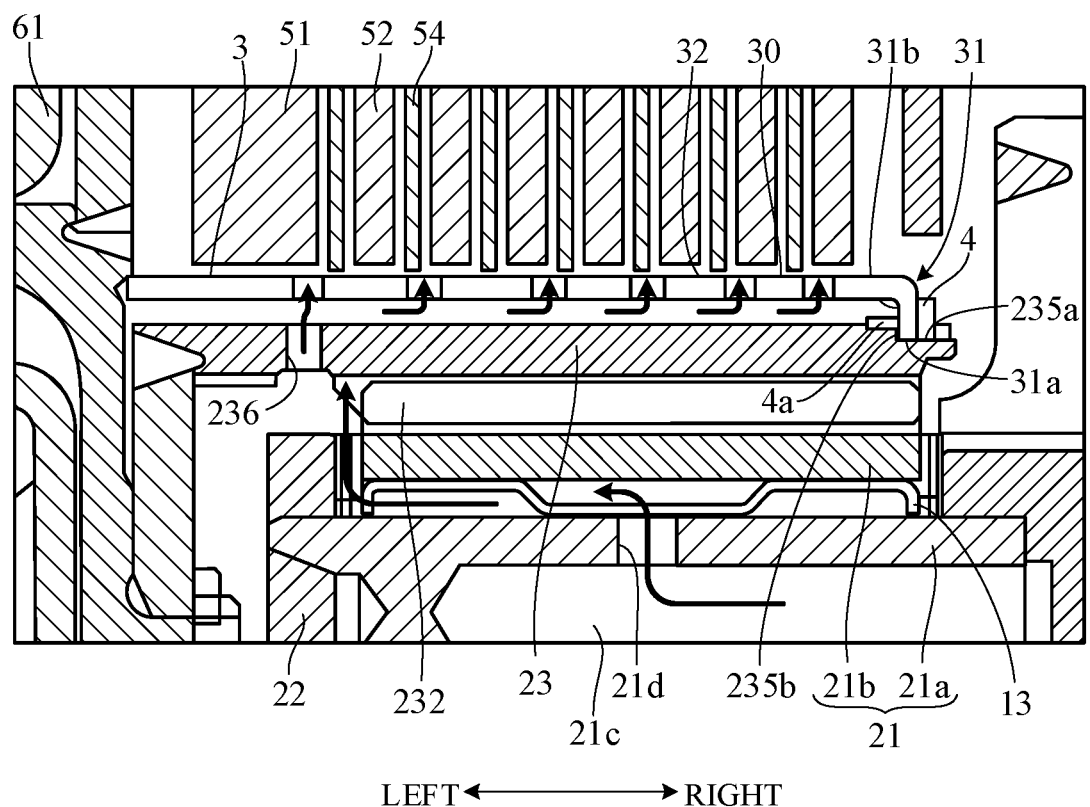
FIG. 5 is a drawing showing a flow of the oil supplied from the planetary gear mechanism to a brake device through the oil plate.

Next, the flow of the oil supplied to the planetary gear mechanism 2 and brake device 5 will be described. FIG. 5 is a drawing showing the flow of the oil supplied from the planetary gear mechanism 2 to the brake device 5 through the oil plates 3.

The oil flowing through the oil passage 10 in the input shaft 1 flows out of the input shaft 1 through the oil hole 11 that passes through the input shaft 1. The oil that has flown out of the input shaft 1 flows between the input shaft 1 and sun gear 20 and thus lubricates the bearing 12. Also, as shown by an arrow in FIG. 5, the oil that has flown out of the input shaft 1 flows between the pinion shaft 21a and pinion gear 21b through an oil hole 21c formed in the pinion shaft 21a and an oil hole 21d communicating with the oil hole 21c and thus lubricates the bearing 13.

The oil that has flown between the pinion shaft 21a and pinion gear 21b further flows axially and then flows radially outward through the gap between the planetary carrier 22 and pinion gear 21b.

The oil that has flown radially outward flows between the teeth of the pinion gear 21b and the internal teeth 232 of the ring gear 23 and then flows out of the ring gear 23 through the first oil holes 236 of the ring gear 23.

The oil that has flown out of the ring gear 23 flows into the brake device 5 through the second oil holes 32 formed in the oil plates 3. In this way, the oil supplied through the oil hole 11 of the input shaft 1 is supplied to the brake device 5 through the oil plates 3.

The present embodiment can achieve advantages and effects such as the following:

(1) The torque transmission apparatus (transmission 100) includes the input shaft 1 that rotates about the axis CL, the planetary gear mechanism 2 that includes the sun gear 20 disposed so as to be rotatable about the axis CL, the planetary gears 21 engaged with the sun gear 20, and the ring gear 23 disposed so as to be rotatable about the axis CL and engaged with the planetary gears 21, the brake device 5 disposed on the radial outside of the ring gear 23, the oil plates 3 attached to the ring gear 23 so as to face the outer circumferential surface of the ring gear 23, and the ring member 4 attached to the ring gear 23 so as to restrict axial movement of the oil plates 3 (FIGS. 1 to 3). The ring gear 23 are provided with the first oil holes 236 that lead the oil supplied through the oil passage 10 formed in the input shaft 1 to the radial outside of the ring gear 23 (FIG. 4A). The oil plates 3 are disposed over the circumferential direction, and the first oil holes 236 are formed over the circumferential direction. The oil plates 3 are disposed so as to face the first oil holes 236 and provided with the second oil holes 32 that lead the oil led through the first oil holes 236 to the brake device 5 (FIG. 4A).

This configuration allows for individually attaching the oil plates 3 to the ring gear 23, and the torque transmission apparatus having such a simple configuration is easy to assemble. For example, in the case of a configuration in which multiple oil plates and a ring member are integrally formed (hereafter referred to as the "oil plate unit"), it may be necessary to adjust the phase of non-toothed portions 234 of a ring gear 23 corresponding to the oil plates of the oil plate unit depending on the shape of each oil plate, the position accuracy of the oil plate unit, or the like. On the other hand, in the present embodiment, the oil plates 3 are individually disposed, eliminating the need for such a phase adjustment. Also, the number of components can be reduced.

Also, in the present embodiment, unlike the case of the oil plate unit, there is less circumferential play in the non-toothed portions 234 to which the oil plates 3 are to be attached. This configuration allows for suppressing leakage of the oil from both circumferential sides of the non-toothed portions 234. Thus, the oil is easily supplied through the second oil holes 32 of the oil plates 3, allowing for improving the guide function that supplies the amount of oil required by the brake device 5.

The oil plates 3 are individually mounted on the non-toothed portions 234. Thus, even if there are variations in the shape of the oil plates 3, it is easy to mount the oil plates 3. Also, the gaps between the body 231 of the ring gear 23 and the brake device 5 formed due to the formation of the non-toothed portions 234 can be easily filled.

(2) Each oil plate 3 includes the rectangular plate portion 30 and the bend portion 31 formed by bending the right end of the plate portion 30 radially inwardly of the ring gear 23 (FIG. 4A). The right end of the outer circumferential surface of the ring gear 23 is provided with the engagement grooves 235 in which the bend portions 31 are to be engaged with the plate portions 30 disposed so as to face the first oil holes 236 (FIG. 2). The engagement grooves 235 are disposed over the circumferential direction.

This configuration allows for easily and reliably attaching the oil plates 3 to the outer circumferential surface of the ring gear 23. Also, axial and circumferential movement of the oil plates 3 is regulated by the engagement grooves 235, allowing for stably attaching the oil plates 3 to the ring gear 23.

(3) The brake device 5 includes the brake discs 54 that are able to move axially along the spline grooves 233a formed in the outer circumferential surface of the ring gear 23 (FIGS. 1 and 3). The oil plates 3 are disposed in the gaps between the outer circumferential surface of the ring gear 23 and the inner circumferential surfaces of the brake discs 54. Accordingly, radially outward movement of the oil plates 3 is regulated by the brake discs 54. When the centrifugal force acts on the oil plates 3 due to rotation of the ring gear 23, this configuration is able to prevent the oil plates 3 from moving away from the non-toothed portions 234 and thus to favorably supply a desired amount of oil to the brake device 5.

(4) The ring member 4 is attached in the engagement grooves 235 in the right end of the ring gear 23 so as to be in contact with the right end surfaces of the bend portions 31 (FIG. 1). The transmission 100 also includes the elastic members 4a disposed in the engagement grooves 235 so as to be in contact with the left end surfaces of the bend portions 31 (FIG. 1). The elastic members 4a allow the ring gear 23 to more firmly support the oil plates 3.

Figure 6A:
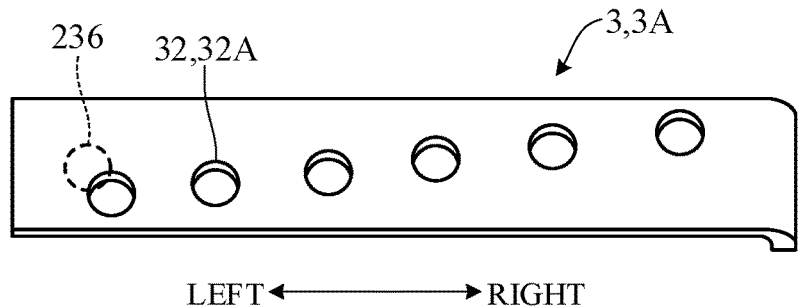
FIG. 6A is a view showing a first modification of the oil plate of FIG. 4A.

While, in the above embodiment, the second oil holes 32 are formed in the approximately central positions in the circumferential direction of the oil plates 3 at equal intervals in the axial direction, the second oil holes 32 may be disposed otherwise. For example, the left second oil holes as a first end side second oil may be formed in more forward positions than the right second oil holes as a second end side second oil hole in the rotation direction R1, which is the rotation direction during forward travel. More specifically, multiple second oil holes 32A may be formed in oil plates 3A as shown in FIG. 6A. Thus, when the oil supplied through the first oil holes 236 of the ring gear 23 is relatively moved by rotation of the ring gear 23 to the rotation direction R2 (FIG. 3) during forward travel of the vehicle, approximately equal amounts of oil can be supplied to the brake device 5 through the second oil holes 32A.

Figure 6B:
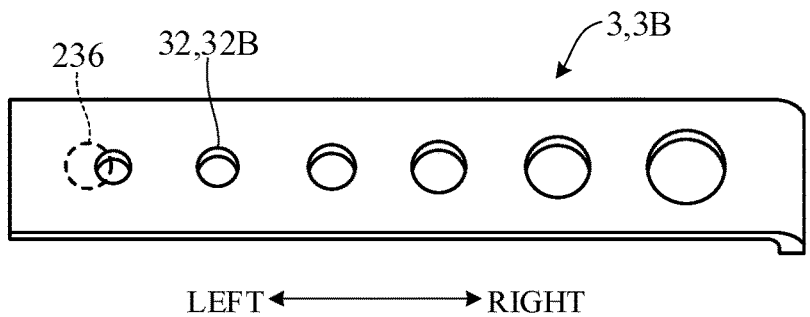
FIG. 6B is a view showing a second modification of the oil plate of FIG. 4A.

As another modification, the opening areas of the right second oil holes 32 as a second end side second oil hole may be made larger than the opening areas of the left second oil holes 32 as a first end side second oil hole. For example, multiple second oil holes 32B may be formed in oil plates 3B as shown in FIG. 6B. This configuration allows for increasing the amount of oil supplied from the second oil holes 32B formed in positions away from the first oil holes 236. Thus, approximately equal amounts of oil can be supplied to the brake device 5 through the second oil holes 32.

Figure 6C:
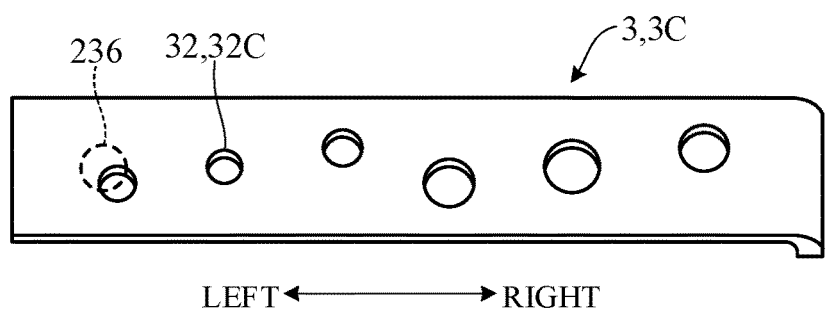
FIG. 6C is a view showing a third modification of the oil plate of FIG. 4A.

As yet another modification, the left second oil holes 32 as a first end side second oil hole may be disposed in more forward positions than the right second oil holes 32 as a second end side second oil hole in the rotation direction R1, which is the rotation direction during forward travel, and the opening areas of the right second oil holes 32 may be made larger than the opening areas of the left second oil holes 32. For example, in an oil plate 3C having multiple (three) right second oil holes 32C and multiple (three) left second oil holes 32C as shown in FIG. 6C, more left second oil holes 32C may be disposed in more forward positions than more right second oil holes 32C in the rotation direction R1, and the opening areas of the three more right second oil holes 32C may be made larger than those of the three more left second oil holes 32C. Thus, approximately equal amounts of oil can be supplied to the brake device 5 through the second oil holes 32.

Figure 6D:
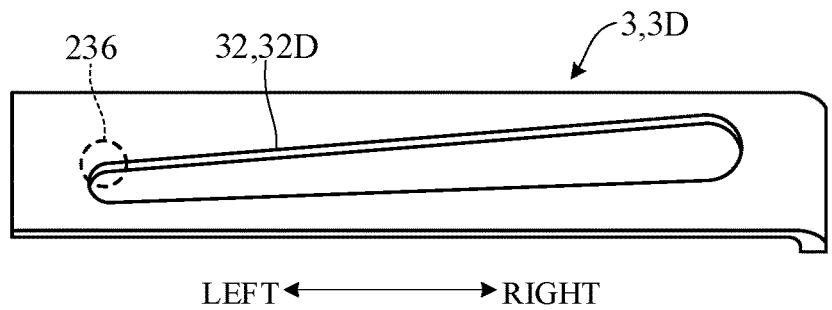
FIG. 6D is a view showing a fourth modification of the oil plate of FIG. 4A.

As still yet another modification, a second oil hole 32D may be formed in an oil plate 3D as shown in FIG. 6D. In the example in FIG. 6D, the single second oil hole 32D is formed in the oil plate 3D, more left portions of the second oil hole 32D are located in more forward positions than more right portions thereof in the rotation direction R1, which is the rotation direction during forward travel of the vehicle, and the opening area thereof gradually increases rightward.

Figure 7:
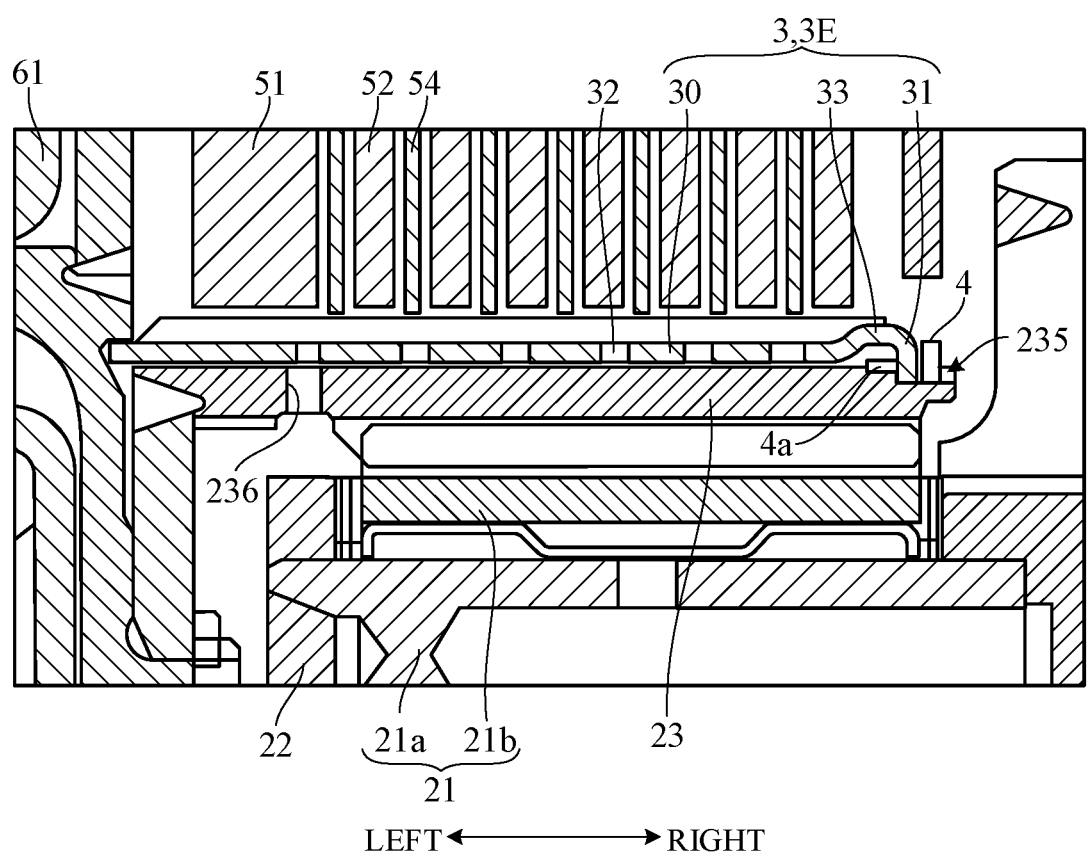
FIG. 7 is a view showing a fifth modification of the oil plate of FIG. 4A.

While, in the above embodiment, the oil plate 3 each include the plate portion 30 and bend portion 31, a plate may be configured otherwise. For example, as shown in FIG. 7, a bend portion 33 that protrudes radially outwardly may be provided at the right end of a plate portion 30 of an oil plate 3E (on the left side of the bend portion 31). Disposing such a bend portion 33 allows for disposing the plate portion 30 adjacent to the non-toothed portion 234 of the ring gear 23. Thus, the space between the oil plate 3E and the brake device 5 is expanded, and the oil is easily supplied to the brake device 5 even if the oil viscosity is high as when the temperature is low.

While, in the above embodiment, axial movement of the oil plates 3 along the outer circumferential surface of the ring gear 23 is restricted by the ring member 4 attached to the ring gear 23, a restriction member may be configured otherwise. While, in the above embodiment, the oil is supplied to the brake device 5 disposed on the radial outside of the ring gear 23 of the planetary gear mechanism 2 through the oil plates 3, a friction engagement device may be a device other than the brake device. That is, the friction engagement device that receives supply of the oil through the plate is not limited to that described above.

The above embodiment can be combined as desired with one or more of the above modifications. The modifications can also be combined with one another.

According to the present invention, it is possible to supply an oil of necessary quantity to a friction engagement device by a simple configuration.

Above, while the present invention has been described with reference to the preferred embodiments thereof, it will be understood, by those skilled in the art, that various changes and modifications may be made thereto without departing from the scope of the appended claims.

What is claimed is:
1. A torque transmission apparatus, comprising:
a rotating shaft extended along an axial line;
a planetary gear mechanism including a sun gear rotatably disposed about the axial line, planetary gears engaged with the sun gear, and a ring gear rotatably disposed about the axial line and engaged with the planetary gear;
a friction engagement device disposed on an outside of the ring gear in a radial direction;
a plate attached to the ring gear so as to face an outer circumferential surface of the ring gears; and
a restriction member attached to the ring gear to restrict a movement of the plate in an axial direction, wherein
a first oil hole is formed at the ring gear so as to lead an oil supplied from an oil passage inside the rotating shaft to an outside of the ring gear in the radial direction,
a second oil hole is formed at the plate so as to lead the oil led through the first oil hole to the friction engagement device, a plurality of the first oil holes in a circumferential direction are formed at the ring gear, and a plurality of the plates in the circumferential direction are attached to the ring gear so as to face the plurality of the first oil holes.

2. The torque transmission apparatus according to claim 1, wherein the plate includes a plate portion formed in a substantially rectangular shape, and a bend portion formed so as to bend an end of the plate portion in the axial direction toward an inside in the radial direction, and the ring gear is provided with an engagement groove at an end of the outer circumferential surface in the axial direction so that the bend portion is engaged with the engagement groove in a state where the plate portion is disposed facing the first oil hole.

3. The torque transmission apparatus according to claim 2, wherein the restriction member is attached to the end of the outer circumferential surface in contact with an end surface of the bend portion in the axial direction, and the torque transmission apparatus further comprises an elastic member disposed in the engagement groove in contact with another end surface of the bend portion in the axial direction.

4. The torque transmission apparatus according to claim 2, wherein the first oil hole is formed on a first end side of the ring gear in the axial direction, a plurality of the second oil holes along the axial direction are formed at the plate, the ring gear is provided to rotate to a first direction about the axial line, the plurality of the second oil holes include a first end side second oil hole on the first end side in the axial direction and a second end side second oil hole on a second end side in the axial direction, and the first end side second oil hole is provided on a side of the first direction in the circumferential direction than the second end side second oil hole.

5. The torque transmission apparatus according to claim 2, wherein the first oil hole is formed on a first end side of the ring gear in the axial direction, a plurality of the second oil holes along the axial direction are formed at the plate, the plurality of the second oil holes include a first end side second oil hole on the first end side in the axial direction and a second end side second oil hole on a second end side in the axial direction, and an opening area of the second end side second oil hole is greater than an opening area of the first end side second oil hole.

6. The torque transmission apparatus according to claim 2, wherein the first oil hole is formed on a first end side of the ring gear in the axial direction, a plurality of the second oil holes along the axial direction are formed at the plate, the ring gear is provided to rotate to a first direction about the axial line, the plurality of the second oil holes include a first end side second oil hole on the first end side in the axial direction and a second end side second oil hole on a second end side in the axial direction, and the first end side second oil hole is provided on a side of the first direction in the circumferential direction than the second end side second oil hole, and an opening area of the second end side second oil hole is greater than an opening area of the first end side second oil hole.

7. The torque transmission apparatus according to claim 2, wherein the first oil hole is formed on a first end side of the ring gear in the axial direction, and the second oil hole is formed so that an aperture length of the second oil hole in the circumferential direction is gradually increased from the first end side to a second end side in the axial direction along a width of the second oil hole.

8. The torque transmission apparatus according to claim 1, wherein the friction engagement device includes a friction plate disposed movably in the axial direction along engagement grooves formed on the outer circumferential surface of the ring gear, the friction plate is formed in a ring plate shape, and the plate is disposed in a gap between the outer circumferential surface of the ring gear and an inner circumferential surface of the friction plate.

9. The torque transmission apparatus according to claim 1, wherein the plurality of the plates are disposed at equal intervals in the circumferential direction.

* * * * *